(12) United States Patent
Allen et al.

(10) Patent No.: US 9,715,016 B2
(45) Date of Patent: Jul. 25, 2017

(54) REAL TIME MULTI DIMENSIONAL IMAGE FUSING

(71) Applicant: The Boeing Company, Chicago, IL (US)

(72) Inventors: Robert C. Allen, Chicago, IL (US); Brendan Blanton, Chicago, IL (US); Lauren Gresko, Chicago, IL (US); Rajib Mitra, Chicago, IL (US); Frank Vincent, Chicago, IL (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 14/644,315

(22) Filed: Mar. 11, 2015

(65) Prior Publication Data

US 2016/0266256 A1   Sep. 15, 2016

(51) Int. Cl.
*G01C 21/26* (2006.01)
*G01C 21/36* (2006.01)
*G01C 23/00* (2006.01)
*G01S 17/87* (2006.01)
*H04N 5/33* (2006.01)
*G01S 17/89* (2006.01)
*G02B 27/01* (2006.01)

(52) U.S. Cl.
CPC .............. *G01S 17/89* (2013.01); *G01C 21/26* (2013.01); *G01C 21/3602* (2013.01); *G01C 23/00* (2013.01); *G01S 17/87* (2013.01); *G02B 27/0172* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 9,347,784 B2 * | 5/2016 | Inoue | B60L 11/1838 |
| 9,489,575 B1 * | 11/2016 | Whalen | G06K 9/00651 |
| 2008/0215204 A1 * | 9/2008 | Roy | G05D 1/0044 701/28 |
| 2010/0182432 A1 * | 7/2010 | Augst | B60R 1/00 348/148 |
| 2010/0225762 A1 * | 9/2010 | Augst | B60R 1/00 348/148 |
| 2010/0231705 A1 * | 9/2010 | Yahav | G02B 27/01 348/115 |
| 2013/0216089 A1 * | 8/2013 | Chen | G06T 7/0002 382/100 |

* cited by examiner

*Primary Examiner* — Reza Aghevli
(74) *Attorney, Agent, or Firm* — McDonnell Boehnen Hulbert & Berghoff LLP

(57) ABSTRACT

Within examples, systems and methods of generating a synthetic image representative of an environment of a vehicle are described comprising generating a first image using infrared information from an infrared (IR) camera, generating a second image using laser point cloud data from a LIDAR, generating an embedded point cloud representative of the environment based on a combination of the first image and the second image, receiving navigation information traversed by the vehicle, transforming the embedded point cloud into a geo-referenced coordinate space based on the navigation information, and combining the transformed embedded point cloud with imagery of terrain of the environment to generate the synthetic image representative of the environment of the vehicle.

19 Claims, 6 Drawing Sheets

REAL TIME MULTI DIMENSIONAL IMAGE FUSING

FIELD

The present disclosure relates generally to generation of a synthetic 3D representation of surroundings of a vehicle based on real time fusing data from multiple sensors that may be displayed on a multifunction display (MFD) of the vehicle and/or a helmet or head mounted display (HMD).

BACKGROUND

During some flight operations, obscurants in the atmosphere such as rain, snow, dust, and/or sand, may cause a pilot's vision to be limited. An ability of the pilot to operate the aircraft in all weather conditions may therefore be reduced in some operational situations. While some aircraft systems, such as radar for example, give additional information to the pilot regarding surroundings of the aircraft, this additional information may not be sufficient to enable the pilot to taxi, take-off and/or land in all conditions when significant amounts of obscurants are present in the atmosphere.

SUMMARY

In one example, a method of generating a synthetic image representative of an environment of a vehicle is described. The method comprises generating a first image of the environment using infrared information from an infrared (IR) camera on the vehicle, generating a second image of the environment using laser point cloud data from a LIDAR on the vehicle, generating an embedded point cloud representative of the environment based on a combination of the first image and the second image such that additional data is embedded into the laser point cloud data, receiving navigation information of the environment traversed by the vehicle from data stored in a navigation database, transforming the embedded point cloud into a geo-referenced coordinate space based on the navigation information, and combining the transformed embedded point cloud with imagery of terrain of the environment to generate the synthetic image representative of the environment of the vehicle.

In another example, a non-transitory computer readable medium having stored thereon instructions that, upon executed by a computing device, cause the computing device to perform functions is described. The functions comprise generating a first image of the environment using infrared information collected from an infrared (IR) camera on an vehicle, generating a second image of the environment using laser point cloud data collected from a LIDAR on the vehicle, generating an embedded point cloud representative of the environment based on a combination of the first image and the second image such that additional data is embedded into the laser point cloud data, receiving navigation information of the environment traversed by the vehicle from data stored in a navigation database, transforming the embedded point cloud into a geo-referenced coordinate space based on the navigation information, and combining the transformed embedded point cloud with imagery of terrain of the environment to generate the synthetic image representative of the environment of the vehicle.

In another example, a system is described comprising an infrared (IR) camera to collect infrared information of an environment of an vehicle, a LIDAR to collect laser point cloud data of the environment of the vehicle, a navigation system configured to determine navigation information of the vehicle, and a processor to generate a synthetic representation of the environment of the vehicle, in real-time while the vehicle is traversing the environment, based on outputs of the IR camera, the LIDAR, and the navigation system. Generation of the synthetic representation comprises generating an embedded point cloud representative of the environment based on a combination of the infrared information and the laser point cloud data such that additional data is embedded into the laser point cloud data, and combining the embedded point cloud with imagery of terrain of the environment. The system also comprises a display to display the synthetic image of the terrain of the environment on a display of the vehicle.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
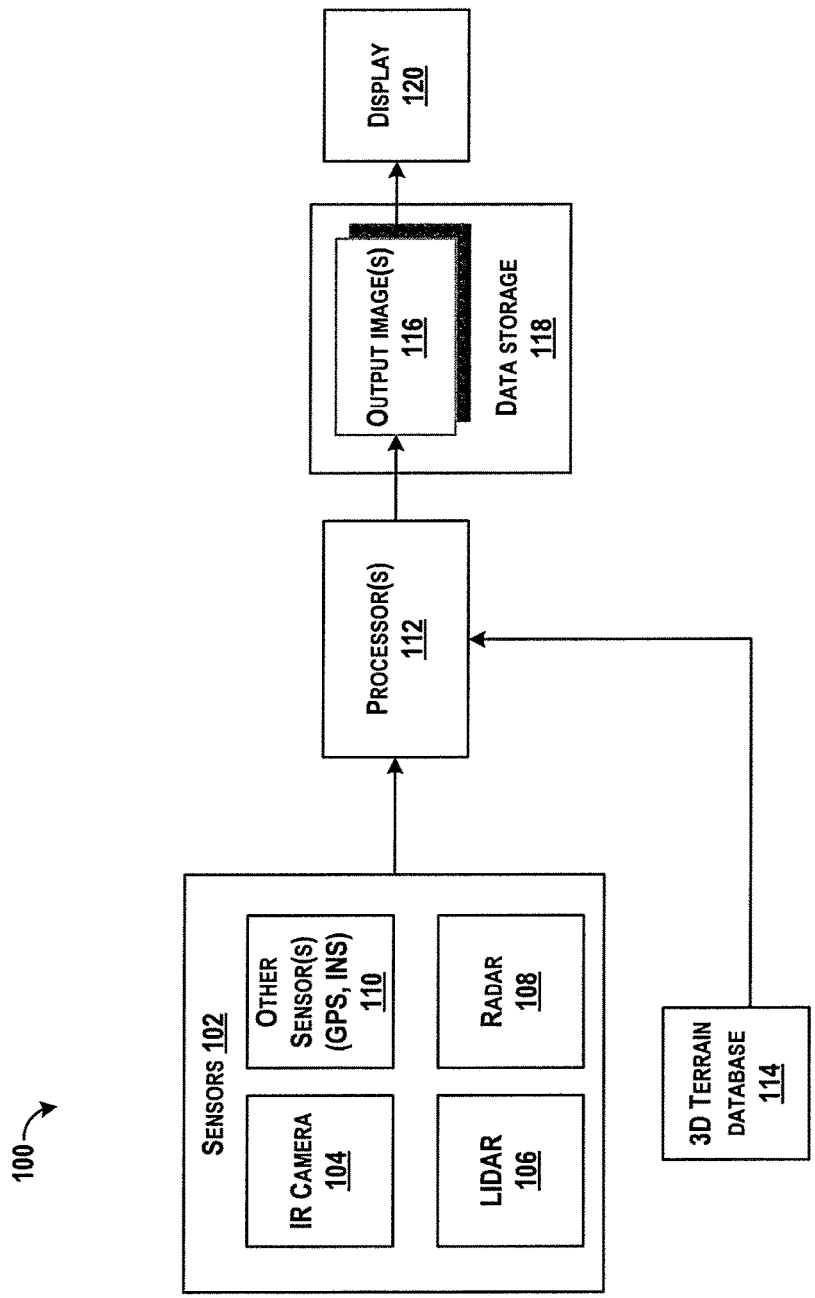
FIG. 1 is a block diagram of an example system for generating synthetic images representative of an environment of a vehicle, such as an aircraft, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

In some instances, during flight operations in near-zero to zero visibility conditions due to presence of obscurants in the atmosphere (e.g. rain, snow, dust, sand), aircrews vision is limited. Example systems and methods described herein can be used to present to the aircrews a synthetically generated image, based on increasing and/or decreasing level of obscurants, for display on multifunction and/or helmet mounted displays of the aircraft. As density of the obscurant increases, intensity of the synthetic image can also be increased, and as obscurants dissipate and decrease in intensity, the synthetic image intensity can also be decreased.

Example systems and methods thus include generating a synthetic image that may be viewed by a pilot when operating in near-zero visibility conditions. An example system includes a long wave infrared (IR) camera, a LIDAR (light detection and ranging) system generating point cloud data, a system or database configured to store three-dimensional (3D) navigation information, and a processor to generate the synthetic image based on outputs from the IR camera, the LIDAR, and the 3D navigation database.

An example method displays fused imagery of the terrain database of the aircraft with imagery generated from multiple sensor outputs to generate the synthetic image. The synthetic image can be composed of multiple (e.g., three) overlaid images. Multiple images that include an image generated by an infrared (IR) camera (e.g., a long wave, mid wave, short wave, or other IR cameras), subsequent images generated by radars or sensors producing point cloud data (e.g., acquired from LIDAR), and other images such as a terrain image acquired from data stored in a 3D navigation database. The images are then overlaid on each other to form the synthetic image or synthetic representation. Each of the three images selected to form the single synthetic image can be time-stamped such that all images represent approximately the same point in time. The output is a real-time synthetically generated image that can be displayed on both multi-function displays (MFD) and head mounted displays (HMD) permitting aircrews or operators to safely operate in near-zero or zero visibility conditions.

Using example systems and methods may increase safety and situational awareness for aircrews operating in less than visual flight rule (VFR) conditions or in degraded visual environments (DVE). For instance, utilizing systems and methods described herein may improve situations to permit aircrews to more safely operate (e.g., taxi, take-off, land, etc.) in low, near-zero, or zero visibility conditions.

Although some examples herein relate to aircraft and aircraft operations, the systems and methods apply to any vehicle being operated in an obscured atmosphere, or to any atmosphere in which embedded 3D point cloud data is collected and used for real-time point cloud visualization including, such as within automotive, mining, and/or aircraft applications to list some examples. Further, such methods can be used in any applications that have or do not have obscurants in the atmosphere or environment. Further applications include use of methods described herein for obstacle detection or collision avoidance for ground and air vehicles.

Referring now to the figures, FIG. 1 is a block diagram of an example system 100 for generating synthetic images representative of an environment of a vehicle, such as an aircraft. The system 100 includes sensors 102, such as an infrared (IR) camera 104, a LIDAR (light detection and ranging) 106, a RADAR (radio detection and ranging) 108, and possibly other sensors 110 that are in communication with a processor 112. The system 100 further includes a three-dimensional (3D) terrain database 114 also in communication with the processor 112. The processor 112 may receive outputs of the sensors 102 and the 3D terrain database 114, and process the outputs to generate output images 116 that are stored in data storage 118. The system 100 may further include a display 120 in communication with the data storage 118 and/or the processor 112 to receive and display the output images 116.

The system 100 may be entirely within a vehicle or an aircraft, or portions of the system 100 may be on an aircraft (e.g., such as the sensors) and portions of the system may be elsewhere or located within other computing devices (e.g., such as the 3D terrain database).

The IR camera 104 may be a long wave IR camera configured to collect infrared information of an environment of a vehicle or aircraft, and to generate an image using the infrared information.

The LIDAR 106 can estimate distance to environmental features while scanning through a scene to assemble a "point cloud" indicative of reflective surfaces in the environment. Individual points in the point cloud can be determined by transmitting a laser pulse and detecting a returning pulse, if any, reflected from any object in the environment, and then determining a distance to the object according to a time delay between the transmitted pulse and reception of the reflected pulse. A laser, or set of lasers, can be rapidly and repeatedly scanned across portions of the environment to generate continuous real-time information on distances to reflective objects in the environment. Combining measured distances and orientation of the laser(s) while measuring each distance allows for associating a three-dimensional position with each returning pulse. In this way, a three-dimensional map of points (e.g., a point cloud) indicative of locations of reflective features in the environment can be generated for the entire scanning zone. The LIDAR 106 may output point cloud data, or may output images generated using point cloud data, for example. Thus, the LIDAR can be configured to collect laser point cloud data of the environment of the vehicle.

The RADAR 108 is an object-detection sensor that uses radio waves to determine range, altitude, direction, or speed of objects in an environment. For example, the RADAR may include an antenna that transmits pulses of radio waves or microwaves that bounce off any object in their path. The object returns a portion of the wave's energy to a receiver of the RADAR for estimation or determination of positioning of the object.

The other sensor(s) 110 may include a variety of sensors included on the vehicle for navigational purposes, such as other imaging cameras, inertial measurement units (IMUs), temperature sensors, SONAR, or any other array of sensors and optical components. In some examples, the sensors 110 may include an inertial navigation system (INS) configured to determine navigation information of the vehicle, a global positioning system (GPS) for determining navigation information as well, or other navigation system.

The 3D terrain database 114 may store terrain images captured by a camera on the vehicle to generate visual representations of the environment of the vehicle.

The processor 112 may receive outputs from the sensors 102 to generate a synthetic image of an environment or surrounding of the vehicle in which the system 100 may reside. Thus, the processor may generate the synthetic image representative of the environment of the vehicle, in real-time while the vehicle is traversing the environment, based on outputs of the IR camera 104, the LIDAR 106, the RADAR 108 and the sensors 110. To do so, in one example, the processor 112 may generate an embedded point cloud representative of the environment based on a combination of the infrared information from the IR camera 104 and the laser point cloud data from the LIDAR 106, and combine the embedded point cloud with imagery of terrain of the environment retrieved from the 3D terrain database 114. The LIDAR data includes voxels with x, y, z, and altitude coordinates, and such values are mapped to the 2D sensor data from the camera 104, with the mappings embedded into the point cloud data as additional metadata.

Terrain images from the 3D terrain database 114 may be overlaid onto the embedded point cloud to generate the output images 116 for storage in the data storage 118 and for display.

The output images 116 include real-time synthetically generated images that are sent to the display 120, which may include both multi-function displays (MFD) and head mounted displays (HMD), permitting aircrews to view the synthetic image. The display 120 may include other displays of a vehicle as well.

The system 100 may be operable at all times, or on demand by operators in the vehicle so as to generate synthetic images of the environment of the vehicle indicating to the pilots secondary images (in addition to primary points of view within a field of view of the pilot), or to indicate to pilots alternative virtual imagery during near-zero or zero visibility conditions for improved safety operations.

Figure 2:
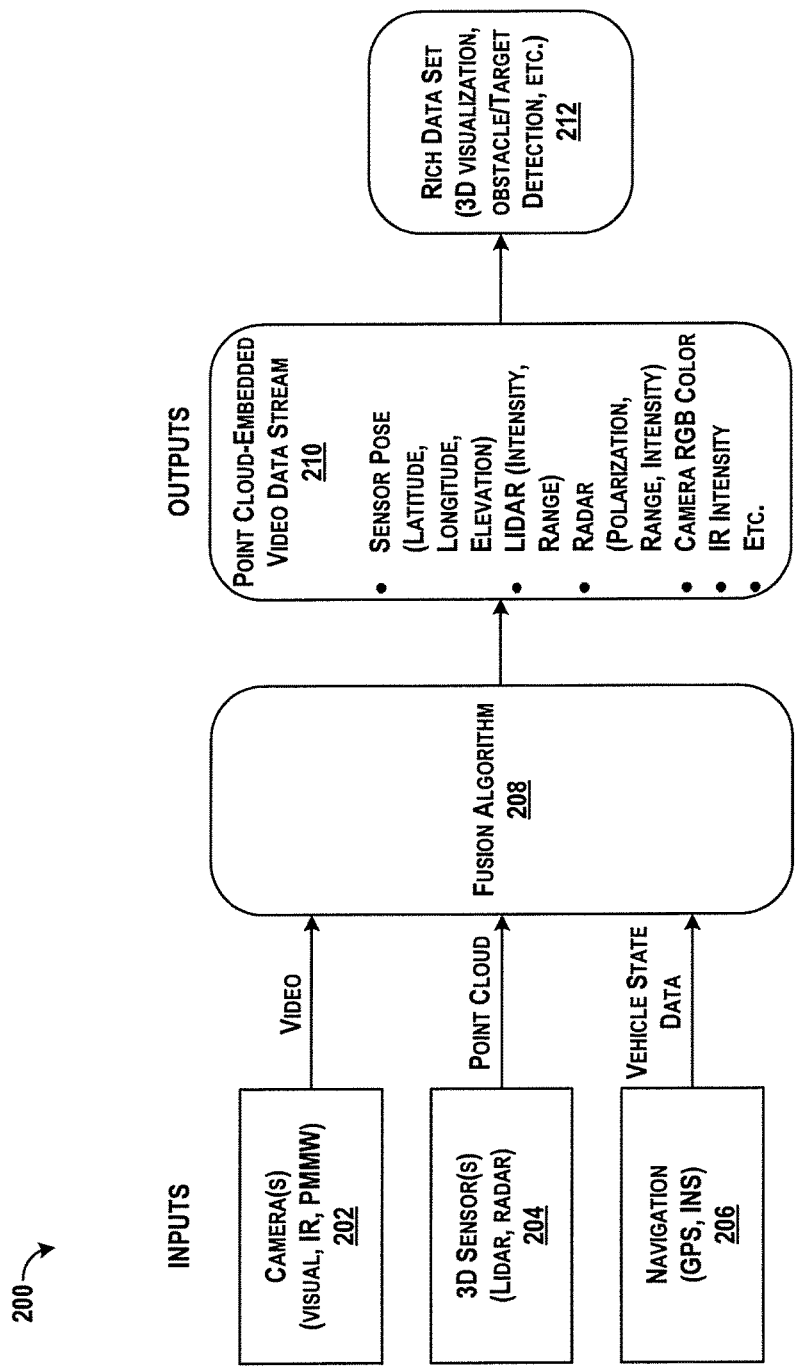
FIG. 2 is a diagram illustrating a system with functional components for generating a synthetic image representative of an environment of a vehicle, according to an example embodiment.

FIG. 2 is a diagram illustrating a system 200 with functional components for generating a synthetic image representative of an environment of a vehicle. The system 200 includes camera(s) 202, such as a visual camera, an IR camera, or a passive millimeter wave (PMMW) imager to output video, 3D sensor(s) 204, such as LIDAR and RADAR to output point cloud data, and navigation sensors 206, such as GPS and navigation system to output vehicle state data (e.g., position, orientation, speed, and accelerations) to a fusion algorithm 208. The 3D sensors 204 generate points in space (e.g., 3D representation of real world) for creation of 3D models of the environment, and the camera 202 may be imaging at high frame rates (i.e., 60 Hz or greater) to create coincident views for combination by the fusion algorithm, based on the vehicle state data, to create a virtual image of the 3D world from a viewpoint of a pilot, for example. The fusion algorithm 208 receives the point cloud data and, for each point created, determines a corresponding point in imagery from the video to embed the image into the 3D representation of the world.

The fusion algorithm 208 outputs a point cloud-embedded video data stream 210 that includes sensor pose (e.g., latitude, longitude, and elevation), LIDAR data (e.g., intensity and range), RADAR data (e.g., polarization, range, and intensity), camera RGB color, IR intensity, and other embedded metadata. For example, LIDAR generates additional information of points, such as reflectance, and all this metadata can be stored for a given point. Other metadata to store includes intensity of that point, color of point (from color camera), range, etc. A rich data set 212 can thus be created for visualization for pilots using the multi-spectral data embedded in the 3D model or further processed for applications such as obstacle or target detection, for example. The rich data set 212 includes data embedded within to provide further detail of objects seen by the sensors.

Within one example, the fusion algorithm 208 can be used to generate a synthetic image that may be viewed by a pilot when operating in near-zero visibility conditions. Imagery of a terrain database of the vehicle can be fused with imagery generated from the multiple sensor outputs to generate the synthetic image. The synthetic image can be composed of three fused datasets. The three datasets include a visual image generated by the camera 202, a second image generated using point cloud data acquired from the LIDAR 204, and a third image is a terrain image acquired from data stored in a 3D navigation database. The output is a real-time synthetically generated image that can be displayed on both multi-function displays (MFD) and head mounted displays (HMD) permitting operators to safely operate in near-zero or zero visibility conditions. The three images are then overlaid on each other to form the synthetic image. It should be realized that each of the three images selected to form the single synthetic image are time-stamped such that all three images represent approximately the same point in time.

Figure 3:
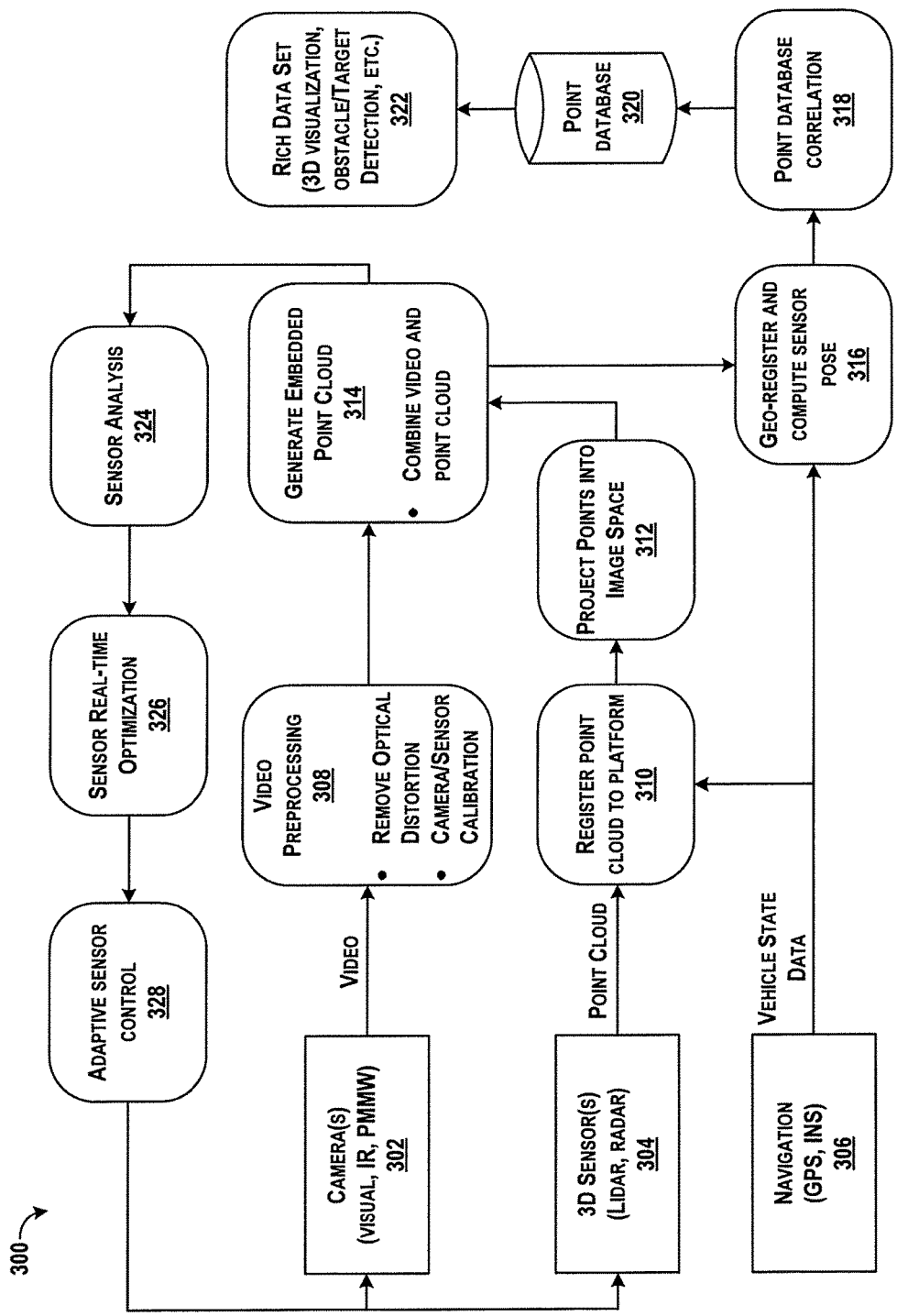
FIG. 3 is a diagram illustrating a detailed system with functional components for generating a synthetic image representative of an environment of a vehicle, according to an example embodiment.

FIG. 3 is a diagram illustrating a detailed system 300 with functional components for generating a synthetic image representative of an environment of a vehicle. Similar to FIG. 2, the system 300 in FIG. 3 includes camera(s) 302 to output video, 3D sensors 304 to output point cloud data, and navigation sensors 306 to output vehicle state data. The video is sent to a video preprocessing module 308 that removes optical distortion, and calibrates the camera outputs, so as to correct for parallax to raw images, for example.

The point cloud data is sent to a registration module 310 to register returns of LIDAR/RADAR to a platform. The registration corrects for sensor parallax, mis-alignment of the sensors, or distortion (e.g., from azimuth angle relative to vehicle motion). After any corrections the point cloud data is sent to a projection module 312 to take each point and project the point into a corresponding pixel location of the video. Projection of the point cloud data into the video includes a geometry mapping of the data in the same reference coordinates. For example, multiple sensors are on a platform at different angles, and projection is required for mapping the data in real-time to the same space (e.g., for every angle in the LIDAR azimuth and elevation mapped to one pixel, and for RADAR can interpolate between pixels for mapping).

Projection may include embedding the 2-D (angle-angle) information into the 3-D (angle-angle-range) point space so that the camera data (e.g., color, or intensity) can be exploited. Sensor pose, field-of-view, and angular resolution of the 3D sensors 304 is considered, and for regions where the 3-D and 2-D sensors overlap, angular resolution is addressed. For example, RADAR may have a lower angular resolution as compared to LIDAR, both of which will be different from the imaging system, or camera. This implies that for a given camera pixel field of view its color or intensity data may be down-sampled or even perhaps up-sampled before its information is embedded into the point cloud data, for example.

After projection of the data into the video, an embedded point cloud is generated, as shown at block 314. Next, the embedded point cloud is geo-registered into a latitude/longitude elevation space based on the vehicle navigation data to calculate where the vehicle was when the data was collected, as shown at block 316. The embedded point cloud data includes platform relative, angle-angle-range or XYZ points, each of which has been enhanced in real-time to contain data from one or more onboard sensors. Now, before the LIDAR point cloud data can be processed further, geo-registration is performed to transform the 3D platform relative point cloud data into 3D geo-referenced (e.g., latitude, longitude, altitude) information. This utilizes accurate GPS six DOF platform data (e.g., latitude, longitude, altitude, heading, pitch, roll) from the navigation sensors 306 and knowledge of the 3-D point cloud sensor attitude and linear offset relative to the navigation reference point. Onboard sensors and a priori terrain elevation data can be used to correct for navigation errors and increase the geo-registration accuracy of the embedded point cloud data to support obstacle/target classification and collision avoidance applications.

Following, a correlation module 318 optimizes the geo-registered data for storage in a point database 320. Point cloud datasets are stored in efficient 3D representations (such as octtrees, voxels, etc). As data is collected, the "best" sensor metadata (described below) is stored and correlated with a 3D point. As points flow into the system, in real-time, the data points from the sensors are analyzed to determine if the data points indicate additional spatial resolution. If so, a new higher resolution point is created in the dataset. If not, the sensor data is evaluated for update.

Various criteria are used for evaluation in the correlation module 318 to identify best sensor data, such as range, viewpoint, navigation accuracy, and sensor measurement accuracy. Range is used since typically the closer a sensor is to a point of measurement, the more accurate the data, and thus, various thresholds in terms of distance/range can be set for evaluation and used in the criteria for further correlation. Viewpoint is used since application of 2D data to 3D world is performed, and it is desired to maintain multiple viewpoints of the same object. Platform navigation accuracy can be used as well for accurate data in terms of geo-registration. Finally, attributes of the sensor are imported to determine what data is retained. These are factors such as measurement accuracy (e.g., RADAR and LIDAR may not work well with low grazing angles to target).

Also, differing levels of obscuration (e.g., smog, rain, etc) can be determined based on outputs of other on-board sensors to determine what the 3D sensors 304 are experiencing and retain data preferentially in clear air conditions.

Thus, correlation of all points satisfying any of desired criteria can be used for maintaining data considered to be useful, resulting in a rich data set for obstacle detection, 3D visualization, etc.

The system 300 further includes a feedback loop including a sensor analysis module 324, a real-time sensor optimization module 326, and an adaptive sensor control module 328. The system 300 operates in real time, as data points are collected, to build the rich data set 322. In real time, there are opportunities to perform adaptive sensor control so as to adjust sensor parameters to better optimize data. For example, based on outputs of on-board sensors, or evaluation of sensor data (e.g., by the sensor analysis module 324), levels of obscuration of the sensors or of the environment can be determined (e.g., snowy environment). Various obscurations can be determined for adjustments of sensor parameters, such as to adjust filters, contrast adjustments, gains, power of laser to avoid saturation, etc. As a specific example, in a snowy condition, it may be desired to lower power of laser in LIDAR to avoid additional spurious returns off of particles/snow in the atmosphere and increase dependence on RADAR.

The adaptive sensor control module 328 may output adjustments to each of the cameras 302, 3D sensors 304, and the navigation sensors 306 to optimize operation of all sensors based on operating conditions of the system 300.

Figure 4:
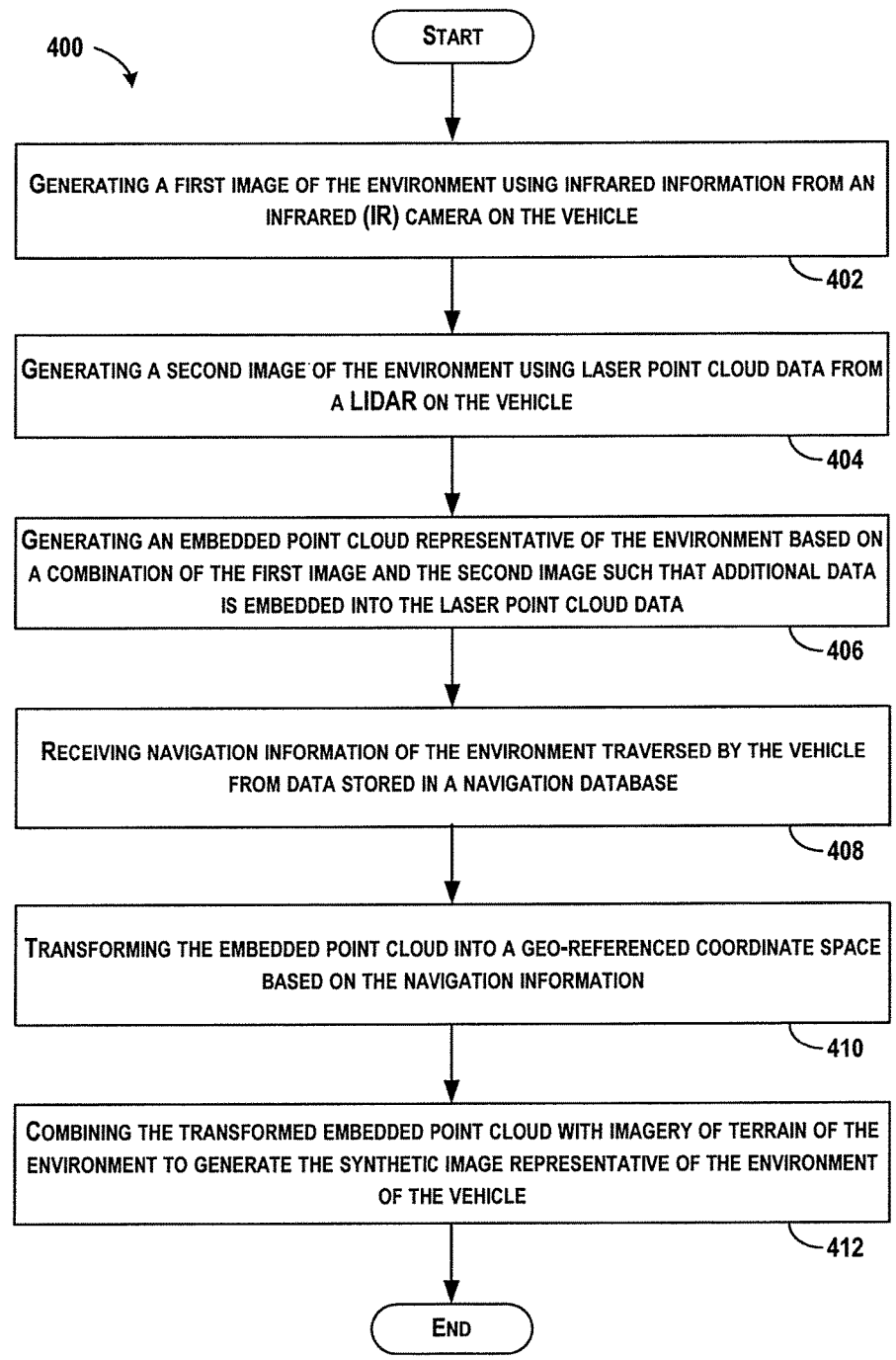
FIG. 4 shows a flowchart of an example method for generating a synthetic image representative of an environment of a vehicle according to an example embodiment.

FIG. 4 shows a flowchart of an example method 400 for generating a synthetic image representative of an environment of a vehicle. Method 400 shown in FIG. 4 presents an embodiment of a method that, for example, could be used with the systems shown in FIGS. 1-3, for example, and may be performed by a computing device (or components of a computing device) such as a client device or a server or may be performed by components of both a client device and a server. Example devices or systems may be used or configured to perform logical functions presented in FIG. 4. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 4 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes generating a first image of the environment using information from an infrared (IR) camera on the vehicle. The camera may image at a high rate, such as at about 60 Hz for example, and output a streaming data video of the environment. Frames of the video may be selected for images of the environment. The camera may be a longwave, short wave, or mid wave IR camera, or other type of 2D sensor that outputs data of an environment.

At block 404, the method 400 includes generating a second image of the environment using laser point cloud data from a LIDAR on the vehicle. In some embodiments, contributions made by the point cloud data generated by the LIDAR can be scaled based on a quantity of aerosols or other obscurants in the atmosphere. For example, in one case when there is little or no obscurants in the air, there will be little or no point cloud data due to low amounts of laser returns. Therefore, a synthetic image generated based on the LIDAR data will be composed mainly of information acquired from the IR camera and other navigation information. Optionally, when there is a large quantity of obscurants in the air, a complete point cloud dataset can be used along with information acquired from the IR camera and the navigation information to generate the synthetic image. Thus, a quantity of LIDAR information utilized to generate the point cloud dataset can be weighted based on a quantity of obscurants in the air.

At block 406, the method 400 includes generating an embedded point cloud representative of the environment based on a combination of the first image and the second image such that additional data is embedded into the laser point cloud data. For each laser data point of the laser point cloud data from the LIDAR, the laser data point may be projected into a corresponding pixel location of the first image so as to map the laser point cloud data onto the first image. The mappings may be based on coordinate values of the laser data, including x, y, z, and altitude, and such mappings that point to the 2D sensor image data of the camera may be embedded into the laser data.

At block 408, the method 400 includes receiving navigation information of the environment traversed by the vehicle from data stored in a navigation database. The first image, the second image, and the navigation information can each be generated and received at approximately the same point in time.

At block 410, the method 400 includes transforming the embedded point cloud into a geo-referenced coordinate space based on the navigation information. In an example, the embedded point cloud data can be transformed by adjusting the embedded point cloud data according to the IR camera and LIDAR attitude and linear offsets relative a navigation system of the vehicle, and adjustments can be made using six degree of freedom (DOF) platform data including latitude, longitude, altitude, heading, pitch, and roll from the navigation system of the vehicle.

At block 412, the method 400 includes combining the transformed embedded point cloud with imagery of terrain of the environment to generate the synthetic image representative of the environment of the vehicle. The synthetic image may be a synthetic representation or a virtual representation of the environment. Combination of the point cloud with imagery may include overlaying an image of the terrain onto the transformed embedded point cloud using the navigation information to map imagery to corresponding points in the point cloud data or vice versa. Following combination of the data, the synthetic image of the terrain of the environment can be displayed on a multi-function display (MFD) of the vehicle, or a head mounted display (HMD).

Within examples, the method 400 is performed in real-time as the infrared information is received from the IR camera and the laser point cloud data is received from the LIDAR during operation of the vehicle traversing the environment. Thus, while the vehicle is traversing the environment, the infrared information is received from the IR camera, the laser point cloud data is received from the LIDAR, the navigation information is received from a navigation system on the vehicle, and the synthetic image representative of the environment of the vehicle is generated for display, and provided for display substantially simultaneously as data is received (after data processing). Developing the rich dataset from multiple sensors in real time allows for enhanced capabilities, such as the adaptive sensor feedback and correlation of features over multiple measurements to retain the optimal 3D dataset. The combined point cloud also allows for algorithms, such as enhanced visualizations, obstacle detection and target detection to operate on a single multi-sensor dataset to enable more efficient processing and greater performance.

In some instances, the method 400 may be triggered or used when the vehicle is operating in a degraded visual environment (DVE) including near-zero to zero visibility conditions. As an example, weather often restricts certain operations or attempted landings of aircraft, and enhanced vision systems certified by FAA for commercial aircraft display some camera imagery combined with aircraft symbology on a screen for about 100 feet above an approach point; however, such displays do not enable landing in a DVE zero visibility environment. Using the method 400, camera images with LIDAR integrated data corresponding to the aircraft's navigation solution can be overlaid onto a digital terrain image to display a synthetic image in real time enabling landing in zero visibility conditions.

Additional functions may be performed in the method 400. As an example, the method 400 may also include determining a level of obscuration of the embedded point cloud, and adjusting parameters of one or more of the IR camera and the LIDAR on the vehicle based on the level of obscuration for adaptive feedback control of sensor parameters. The level of obscuration may be determined based on outputs of other on-board sensors that can indicate a level of precipitation in the environment, or based on analysis of the point cloud data. As one specific example, based on high levels of precipitation, a power of the LIDAR may be reduced to lower amounts of spurious returns due to reflections off of the rain/snow in the atmosphere.

The infrared information from the systems sensors and the laser point cloud data from the LIDAR can further be stored into a dataset, and as data of the infrared information from the IR camera and the laser point cloud data from the LIDAR is received, functions can be performed to determine whether the data indicates additional spatial resolution of a representation of the environment. For instance in clear environments, additional data can be received to build a more rich higher resolution image, and in more cloudy environments, data may not be useful for indicating higher resolution but can be evaluated for updates of alternate viewpoints, for example. Whether the data indicates additional spatial resolution of the representation of the environment may be based on whether the data is of an alternate range or viewpoint to a targeted object or area, or can also be based on sensor measurement accuracy.

Figure 5:
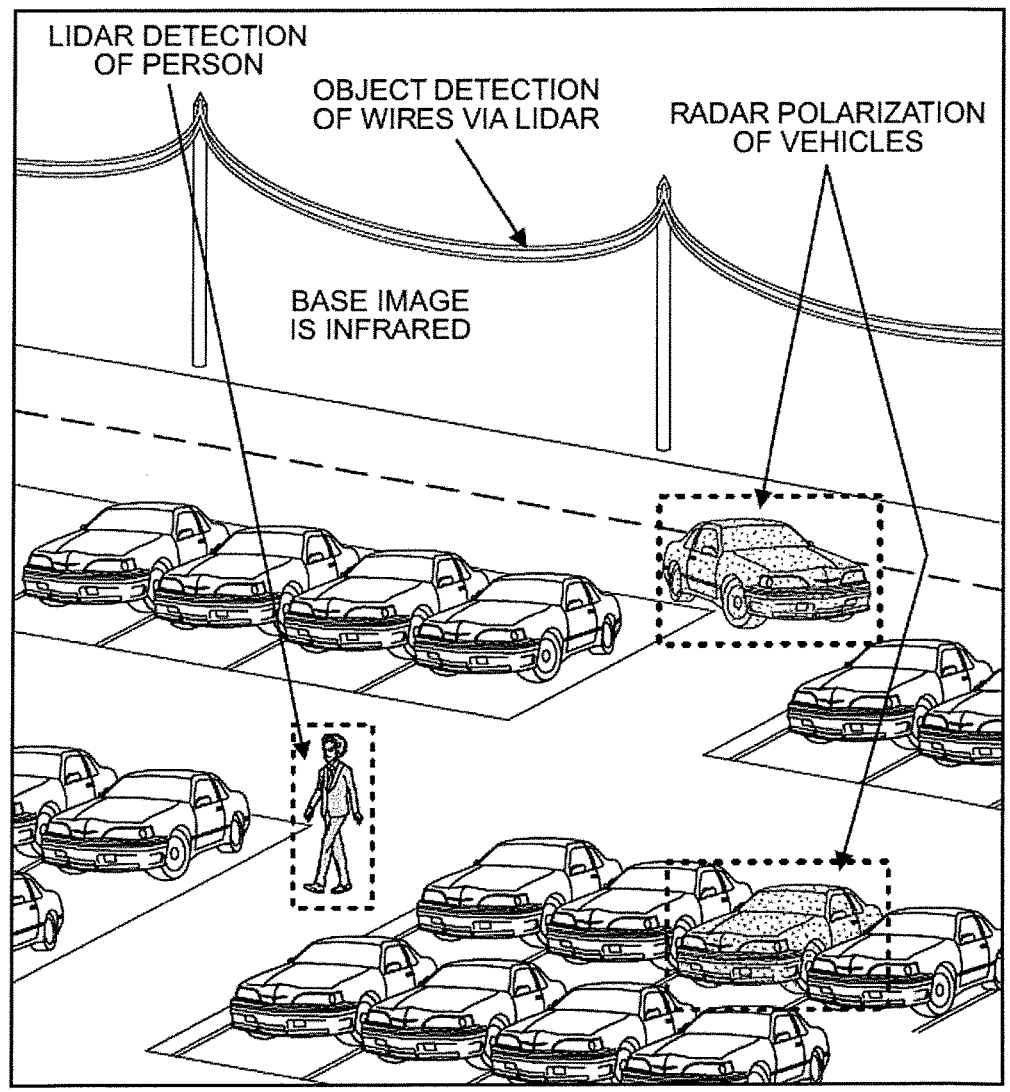
FIG. 5 is an example synthetic image representative of an environment of a vehicle, according to an example embodiment.

FIG. 5 is an example synthetic image representative of an environment of a vehicle. The image in FIG. 5 depicts an example image of multiple sensor fusion. Three different sensors (e.g., LIDAR, RADAR, and IR camera) have outputs fused together to generate an enhanced image. This capability can be expanded to "n" number of 3D and 2D sensors.

In FIG. 5, a base image is determined using infrared information. The base information indicates a number of details of objects including roads, trees, cars, and placement of each respective to each other. LIDAR data may indicate point cloud representations of objects, such as a person, or overhead hanging wires. RADAR data may indicate polarization data of some vehicles. All of the data may be mapped over overlaid onto terrain imagery to indicate further illustrations of the data. By exploiting this rich data set, object detection can be enhanced, as well as generation of a 3D visualization of the environment in real time.

Figure 6:
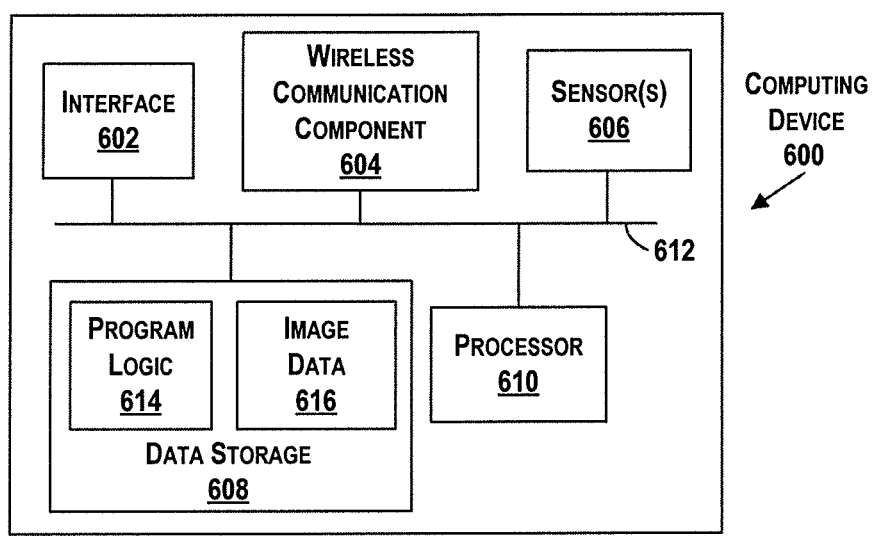
FIG. 6 illustrates a schematic drawing of an example computing device, according to an example embodiment.

As mentioned, portions of any of the methods described herein (e.g., the method 400) may be performed by a computing device (or components of a computing device), as well as by components of elements shown in FIG. 1. FIG. 6 illustrates a schematic drawing of an example computing device 600. The computing device 600 in FIG. 6 may represent devices shown in FIGS. 1-3 including the processors, the fusion algorithm, or any of the blocks conceptually illustrating computing components in FIG. 3, or the computing device 600 may represent the systems in FIGS. 1-3 in general. In some examples, some components illustrated in FIG. 6 may be distributed across multiple computing devices. However, for the sake of example, the components are shown and described as part of one example device 600. The computing device 600 may be or include a mobile device, desktop computer, email/messaging device, tablet computer, or similar device that may be configured to perform the functions described herein.

The computing device 600 may include an interface 602, a wireless communication component 604, sensor(s) 606, data storage 608, and a processor 610. Components illustrated in FIG. 6 may be linked together by a communication link 612. The computing device 600 may also include hardware to enable communication within the computing device 600 and between the computing device 600 and another computing device (not shown), such as a server entity. The hardware may include transmitters, receivers, and antennas, for example.

The interface 602 may be configured to allow the computing device 600 to communicate with another computing device (not shown), such as a server. Thus, the interface 602 may be configured to receive input data from one or more computing devices, and may also be configured to send output data to the one or more computing devices. In some examples, the interface 602 may also maintain and manage records of data received and sent by the computing device 600. The interface 602 may also include a receiver and transmitter to receive and send data. In other examples, the interface 602 may also include a user-interface, such as a keyboard, microphone, touchscreen, etc., to receive inputs as well.

The wireless communication component 604 may be a communication interface that is configured to facilitate wireless data communication for the computing device 600 according to one or more wireless communication standards. For example, the wireless communication component 604 may include a Wi-Fi communication component that is configured to facilitate wireless data communication according to one or more IEEE 802.11 standards. As another example, the wireless communication component 604 may include a Bluetooth communication component that is configured to facilitate wireless data communication according to one or more Bluetooth standards. Other examples are also possible.

The sensor 606 may include one or more sensors, or may represent one or more sensors included within the computing device 600. Example sensors include an accelerometer, gyroscope, pedometer, light sensors, microphone, camera, or other location and/or context-aware sensors.

The data storage 608 may store program logic 614 that can be accessed and executed by the processor 610. The data storage 608 may also store collected sensor data or image data 616.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of generating a synthetic image representative of an environment of a vehicle, the method comprising:
    generating a first image of the environment using infrared information from an infrared (IR) camera on the vehicle;
    generating a second image of the environment using laser point cloud data from a light detection and ranging (LIDAR) on the vehicle;
    for each laser data point of the laser point cloud data from the LIDAR, projecting the laser data point into a corresponding pixel location of the first image so as to map the laser point cloud data onto the first image;
    based on mapping the laser point cloud data onto the first image, generating an embedded point cloud representative of the environment based on a combination of the first image and the second image such that additional data is embedded into the laser point cloud data;
    receiving navigation information of the environment traversed by the vehicle from data stored in a navigation database;
    transforming the embedded point cloud into a geo-referenced coordinate space based on the navigation information; and
    combining the transformed embedded point cloud with imagery of terrain of the environment to generate the synthetic image representative of the environment of the vehicle.

2. The method of claim 1, wherein the first image, the second image, and the navigation information are each generated and received at approximately the same point in time.

3. The method of claim 1, wherein transforming the embedded point cloud data into the geo-referenced coordinate space based on the navigation information comprises:
    adjusting the embedded point cloud data according to the IR camera and LIDAR attitude and linear offsets relative a navigation system of the vehicle, wherein adjustments are made using six degree of freedom (DOF) platform data including latitude, longitude, altitude, heading, pitch, and roll from the navigation system of the vehicle.

4. The method of claim 1, wherein combining the transformed embedded point cloud with imagery of terrain of the environment comprises:
    overlaying an image of the terrain onto the transformed embedded point cloud.

5. The method of claim 1, further comprising displaying the synthetic image of the terrain of the environment on a multi-function display (MFD) of the vehicle.

6. The method of claim 1, further comprising displaying the synthetic image of the terrain of the environment on a head mounted display (HMD).

7. The method of claim 1, further comprising performing the method in real-time as the infrared information is received from the IR camera and the laser point cloud data is received from the LIDAR during operation of the vehicle traversing the environment.

8. The method of claim 1, further comprising, while the vehicle is traversing the environment:
    receiving the infrared information from the IR camera;
    receiving the laser point cloud data from the LIDAR;

receiving the navigation information from a navigation system on the vehicle;

performing the method in real-time to generate the synthetic image representative of the environment of the vehicle while the vehicle is traversing the environment; and displaying the synthetic image of the terrain of the environment on a display of the vehicle.

9. The method of claim 1, further comprising:

generating the synthetic image based on the vehicle operating in a degraded visual environment (DVE) including near-zero to zero visibility conditions.

10. The method of claim 1, further comprising:

determining a level of obscuration of the embedded point cloud; and adjusting parameters of one or more of the IR camera and the LIDAR on the vehicle based on the level of obscuration for adaptive feedback control of sensor parameters.

11. The method of claim 1, further comprising:

storing the infrared information from the IR camera and the laser point cloud data from the LIDAR into a dataset;

determining, as data of the infrared information from the IR camera and the laser point cloud data from the LIDAR is received, whether the data indicates additional spatial resolution of a representation of the environment;

based on the data indicating the additional spatial resolution, generating a new higher resolution data point in the dataset; and based on the data not indicating the additional spatial resolution, evaluating the data for update.

12. The method of claim 11, wherein determining whether the data indicates additional spatial resolution of the representation of the environment comprises:

determining whether the data is of an alternate range or viewpoint to a targeted object or area.

13. The method of claim 11, wherein determining whether the data indicates additional spatial resolution of the representation of the environment comprises:

determining sensor measurement accuracy, wherein the sensor measurement accuracy is based on a level of obscuration of the environment.

14. A non-transitory computer readable medium having stored thereon instructions that, upon executed by a computing device, cause the computing device to perform functions comprising:

generating a first image of the environment using infrared information collected from an infrared (IR) camera on an vehicle;

generating a second image of the environment using laser point cloud data collected from a light detection and ranging (LIDAR) on the vehicle;

for each laser data point of the laser point cloud data from the LIDAR, projecting the laser data point into a corresponding pixel location of the first image so as to map the laser point cloud data onto the first image;

based on mapping the laser point cloud data onto the first image, generating an embedded point cloud representative of the environment based on a combination of the first image and the second image such that additional data is embedded into the laser point cloud data;

receiving navigation information of the environment traversed by the vehicle from data stored in a navigation database;

transforming the embedded point cloud into a geo-referenced coordinate space based on the navigation information; and combining the transformed embedded point cloud with imagery of terrain of the environment to generate the synthetic image representative of the environment of the vehicle.

15. The non-transitory computer readable medium of claim 14, wherein combining the transformed embedded point cloud with imagery of terrain of the environment comprises:

overlaying an image of the terrain onto the transformed embedded point cloud.

16. The non-transitory computer readable medium of claim 14, further comprising performing the functions in real-time as the infrared information is received from the IR camera and the laser point cloud data is received from the LIDAR during operation of the vehicle traversing the environment.

17. A system comprising:

an infrared (IR) camera to collect infrared information of an environment of an vehicle;

a light detection and ranging (LIDAR) to collect laser point cloud data of the environment of the vehicle;

a navigation system configured to determine navigation information of the vehicle;

a processor to generate a synthetic representation of the environment of the vehicle, in real-time while the vehicle is traversing the environment, based on outputs of the IR camera, the LIDAR, and the navigation system, wherein generation of the synthetic representation comprises:

for each laser data point of the laser point cloud data from the LIDAR, projecting the laser data point into a corresponding pixel location of the first image so as to map the laser point cloud data onto the first image;

based on mapping the laser point cloud data onto the first image, generating an embedded point cloud representative of the environment based on a combination of the infrared information and the laser point cloud data such that additional data is embedded into the laser point cloud data;

combining the embedded point cloud with imagery of terrain of the environment; and a display to display the synthetic image of the terrain of the environment on a display of the vehicle.

18. The system of claim 17, wherein the processor is further configured to generate the synthetic representation based on the vehicle operating in a degraded visual environment (DVE) including near-zero to zero visibility conditions.

19. The system of claim 17, wherein the processor is further configured to:

determine a level of obscuration of the embedded point cloud; and adjust parameters of one or more of the IR camera and the LIDAR on the vehicle based on the level of obscuration for adaptive feedback control of sensor parameters.

* * * * *